United States Patent
Lowmiller et al.

(10) Patent No.: US 6,301,364 B1
(45) Date of Patent: Oct. 9, 2001

(54) TAGGING ECHOES WITH LOW FREQUENCY NOISE

(75) Inventors: Donald Allan Lowmiller, Chandler; Kendall G. Moore, Tempe; Samuel L. Thomasson, Gilbert, all of AZ (US)

(73) Assignee: Acoustic Technologies, Inc., Mesa, AZ (US)

(*) Notice: Subject to any disclaimer, the term of this patent is extended or adjusted under 35 U.S.C. 154(b) by 0 days.

(21) Appl. No.: 09/413,675

(22) Filed: Oct. 6, 1999

(51) Int. Cl.$^7$ .............................. H04B 3/20; H04B 15/00
(52) U.S. Cl. ................................ 381/66; 381/93
(58) Field of Search .................... 379/406, 410, 379/411; 381/83, 93, 66, 318

(56) References Cited

U.S. PATENT DOCUMENTS

| | | | |
|---|---|---|---|
| 4,645,883 | 2/1987 | Horna et al. ............. | 379/406 |
| 4,969,144 * | 11/1990 | Blackwell et al. ........ | 370/32.1 |
| 5,243,303 | 9/1993 | Murata et al. ............ | 331/78 |
| 5,412,734 | 5/1995 | Thomasson ................ | 351/83 |
| 5,649,019 | 7/1997 | Thomasson ................ | 381/83 |
| 6,061,444 * | 5/2000 | Kawahara et al. .......... | 379/410 |

OTHER PUBLICATIONS

Brennan, Paul V., "Phase–Locked Loops: Principles and Practice", R.R. Donnelley & Sons Company (1996), pp. 8–9.

* cited by examiner

*Primary Examiner*—Forester W. Isen
*Assistant Examiner*—Brian Tyrone Pendleton
(74) *Attorney, Agent, or Firm*—Paul F. Willie

(57) ABSTRACT

A low pass limited, low frequency pseudo-random noise signal is added to the input signal for tagging the input signal in order to facilitate correlation with an echo.

4 Claims, 2 Drawing Sheets

TAGGING ECHOES WITH LOW FREQUENCY NOISE

CROSS-REFERENCE TO RELATED APPLICATION

This application contains subject matter in common with application Ser. No. 09/361,014, filed Jul. 23, 1999, entitled "High Resolution Delay Line", and assigned to the assignee of this invention. The contents of said earlier filed application are hereby incorporated by reference into this application.

BACKGROUND OF THE INVENTION

This invention relates to circuits for reducing acoustic feedback in electro-acoustic systems and, in particular, to reducing feedback by the use of a low frequency noise signal.

Sound waves are slight variations in air pressure that a microphone converts into an electrical signal of varying amplitude. In a speaker phone or other electro-acoustical device, the electrical signal is amplified and converted back into sound waves by one or more speakers.

In theory, a signal passes through a system once, never to return. In a "speaker phone," there can be a significant level of acoustic coupling between the speakers and the microphone. When the output of an amplifier is coupled to the input of the amplifier, one has feedback, a closed loop with the potential to oscillate. Typically, speaker phones detect feedback and respond by turning off one channel to the conversation. The telephone is reduced to "half duplex" or simplex operation, i.e. single direction at a time. The speaker at one station must stop and the circuits must re-settle before a person at the other station can be heard. Unless people happen to be used to speaking on such a system, amateur radio operators for example, it can be very difficult to carry on a conversation.

There are two difficulties in eliminating feedback in an acoustic system. One difficulty is determining whether the signal passing through the amplifier is from an echo or from an original sound. A second difficulty is determining the travel time of the echo. U.S. Pat. No. 5,412,734 (Thomasson) discloses an system for resolving these difficulties by tagging an original sound with an inaudible replica of that sound, wherein the replica is a frequency modulated (FM) high frequency carrier. U.S. Pat. No. 5,649,019 (Thomasson) discloses a similar system, wherein the replica is a pulse width modulated (PWM) high frequency carrier.

Although FM and PWM are effective techniques, it is desired to improve the efficiency and effectiveness of echo cancellation using an inaudible acoustic tag. Above 20 kHz, the characteristics of acoustic transducers and of a room change significantly with frequency. Also, using a signal of 20–40 kHz can introduce distortions due to the change in characteristics of the transducers between 20 kHz and 40 kHz. In addition, ultrasonic sounds tend to be highly directional and reflections can cause multiple echoes of nearly the same magnitude. Thus, the ultrasonic sounds my not represent what is happening to the audible sound in a room.

Copending application Ser. No. 09/401,349, filed Sep. 21, 1999, entitled "Echo Cancelling Process with Improved Phase Control" and assigned to the assignee of this application, discloses a system in which coarse and fine delays are made in separate control loops to adjust precisely the delay of an echo for cancellation. Although the particular technique described does not require a tagged signal, it is desired to improve the system by providing a known signal for locking at least the coarse delay control loop.

The time required for a control system to stabilize is called the convergence time. In electronic systems, this time is usually relatively short. In the prior art, many echo cancelling systems perform some sort of test at the beginning of a telephone call and then do not change for the remainder of the call. In an actual telephone call, the characteristics of an echo can change considerably, e.g. a person on a speaker phone moves about a room. Thus, it is desired that the echo cancelling system converge quickly, thereby enabling the system to continuously correct for echo during a call.

During a telephone call, the amplitude of the sound is not uniform, even if averaged. For a control system to converge, it is preferred to have a continuous signal with which to operate. Using an automatic gain control (AGC) is undesirable because the AGC circuit itself is a control loop with its own time for convergence. Tagging with an audible tone would provide a steady signal for the control circuitry but is undesirable in that the tone is perceived by the user and is likely to be annoying, even if intermittent or perhaps especially if intermittent.

In view of the foregoing, it is therefore an object of the invention to provide a low frequency tag for eliminating acoustic echoes.

Another object of the invention is to provide an acoustic tag that is unobtrusive in a telephone system.

A further object of the invention is to provide an acoustic tag that is substantially non-directional.

Another object of the invention is to provide a tag that is easily found and quickly converged upon.

A further object of the invention is to provide a reliable signal upon which the echo cancelling system can converge.

SUMMARY OF THE INVENTION

The foregoing objects are achieved in the invention wherein a low pass limited, low frequency pseudo-random noise signal is added to the input signal for tagging the input signal in order to facilitate correlation with a composite signal containing an echo.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
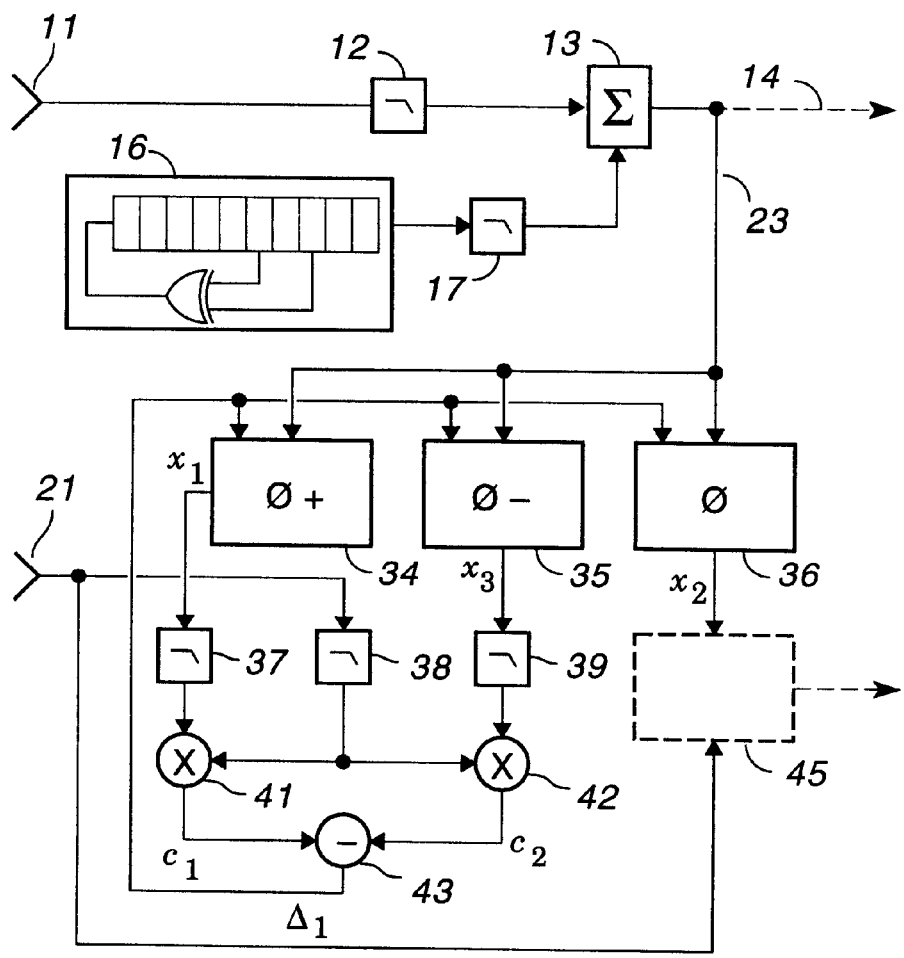
FIG. 1 is a block diagram of an echo cancelling system constructed in accordance with a preferred embodiment of the invention.
Figure 2:
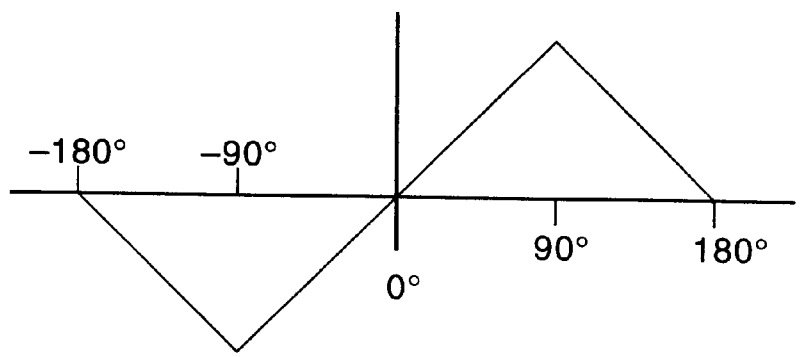
FIG. 2 illustrates the operation of the circuitry in FIG. 1.

FIG. 1 illustrates a preferred embodiment of the invention in which a signal representing the original sound is tagged or combined with low frequency noise for detecting an echo. Line input 11 is coupled to a telephone network, for example, that provides an incoming signal. The signal is filtered in filter 12, e.g. a low pass filter for removing aliases, and coupled to a first input of summation network 13. The output of summation network 13, which can be active or passive, is ultimately coupled to a speaker, as indicated by dashed arrow 14.

Noise generator 16 can be any desired source of random noise or pseudo-random noise. It is not necessary that the noise be random in the mathematical sense of a non-repeating signal. A convenient source for a pseudo-random signal is known as a linear feedback shift register, also known as a polynomial counter. U.S. Pat. No. 5,234,303 (Murata et al.) describes a noise generator using a linear feedback shift register in which the outputs of the register are resistively weighted.

In a preferred embodiment of the invention, the output from one stage of a linear feedback shift register is simply applied to low pass filter 17, which preferably has a cut-off frequency of about 300 Hz. The output of filter 17 is coupled to a second input of summation circuit 13. If there happens to be a quiet pause in a telephone conversation, a listener could hear a soft rushing noise on the line. At other times, the low frequency noise signal is not easily noticed or is inaudible.

If sound should be coupled back to microphone input 21, it is delayed primarily by the acoustic path from the speaker (not shown) to the microphone (not shown). There is also some delay in the electronic circuits. Thus, the signal on line 23 must be delayed in order to correlate with the noise tag in the composite signal from microphone input 21.

Correlating with a noise signal produces a more distinct output signal at match than correlating two non-random signals. Thus, a control loop converges more quickly with the signal from noise generator 16 than with a more periodic signal.

In a preferred embodiment of the invention, the delay matching circuitry includes three, substantially identical delaying circuits 34, 35, and 36 in the form of a plurality of analog memory sites, described in detail in connection with FIG. 3. Other delay circuits could be used instead. What is important is that delays change together. As indicated by the legends within the blocks, delay circuit 34 produces a slightly greater delay than circuit 36 and delay circuit 35 produces a slightly smaller delay than circuit 36.

The outputs from delay circuits 34 and 35 are each correlated with the signal from microphone input 21 to determine whether or not the amount of delay is correct. Specifically, output signal $x_1$ from delay circuit 34 is low pass filtered and coupled to one input of multiplier 41. Output signal $X_3$ from delay circuit 35 is low pass filtered and coupled to one input of multiplier 42. The signal on microphone input 21 is low pass filtered and coupled to multipliers 41 and 42. The low pass filters, represented by blocks 37, 38, and 39, remove extraneous signals and leave the noise signal from source 16.

Output signals $c_1$ and $c_2$ from multipliers 41 and 42 are subtracted in difference circuit 43. Output signal $\Delta_1$ from difference circuit 43 is coupled to the control inputs of delay circuits 34, 35, and 36. All three delaying circuits are adjusted in the same way at the same time.

Multipliers 41 and 42 each include an averaging or a low pass filter circuit to smooth the output signal. When the best delay match is obtained, the outputs from multipliers 41 and 42 will be approximately equal in magnitude and subtracting the signals produces the signal ($\Delta_1$). As a match is found, output signal $\Delta_1$ converges toward zero from either direction. Because of noise or slight variations in circuit parameters, $\Delta_1$ may reach a minimum rather than zero. In any case, the control loop converges rapidly, within fifty milliseconds or so, on a solution and remains stable for as long as the input signals are unchanged. Suitable circuits for multipliers 41 and 42 are known in the art, such as multi-plying phase detectors; see Brennan, Paul V., *"Phase-Locked Loops: Principles and Practice"*, R. R. Donnelley & Sons Company (1996), pages 8–9.

Output signal $x_2$ from delay circuit 36 preferably leads the composite signal from microphone input 21 when a match is indicated by output signal $\Delta_1$ from difference circuit 38. This enables a fine delay correction, indicated by dashed block 45, to start at zero and to converge rapidly on an exact match because the change in delay is in one direction only. The offset is easily obtained by setting circuit 36 to a delay that is not midway between circuits 34 and 35 but slightly closer to the delay of circuit 35. Note that this does not affect the symmetry of the control loop. The output from dashed block 45 ultimately goes to the line output of the telephone.

In a preferred embodiment of the invention, the three delay circuits are implemented as a plurality of analog storage sites that are addressed and written, preferably sequentially and consecutively. A later read operation at a given site is delayed from the write signal by a known, adjustable amount, thus producing a variable delay. The delay can be considerable, in excess of 500 milliseconds. Sampled at 8,000 samples per second, a memory need only 4,000 storage sites for one half second of data. Such memory is readily available and can easily fit into a cellular telephone, for example.

The number of storage sites between the site being written and the site being read is directly proportional to delay. In accordance with the invention, three storage sites are read simultaneously. The three sites need not be consecutive or adjoining but are sequential, with the second site preferably approximately midway between the first site and the third site.

Figure 3:
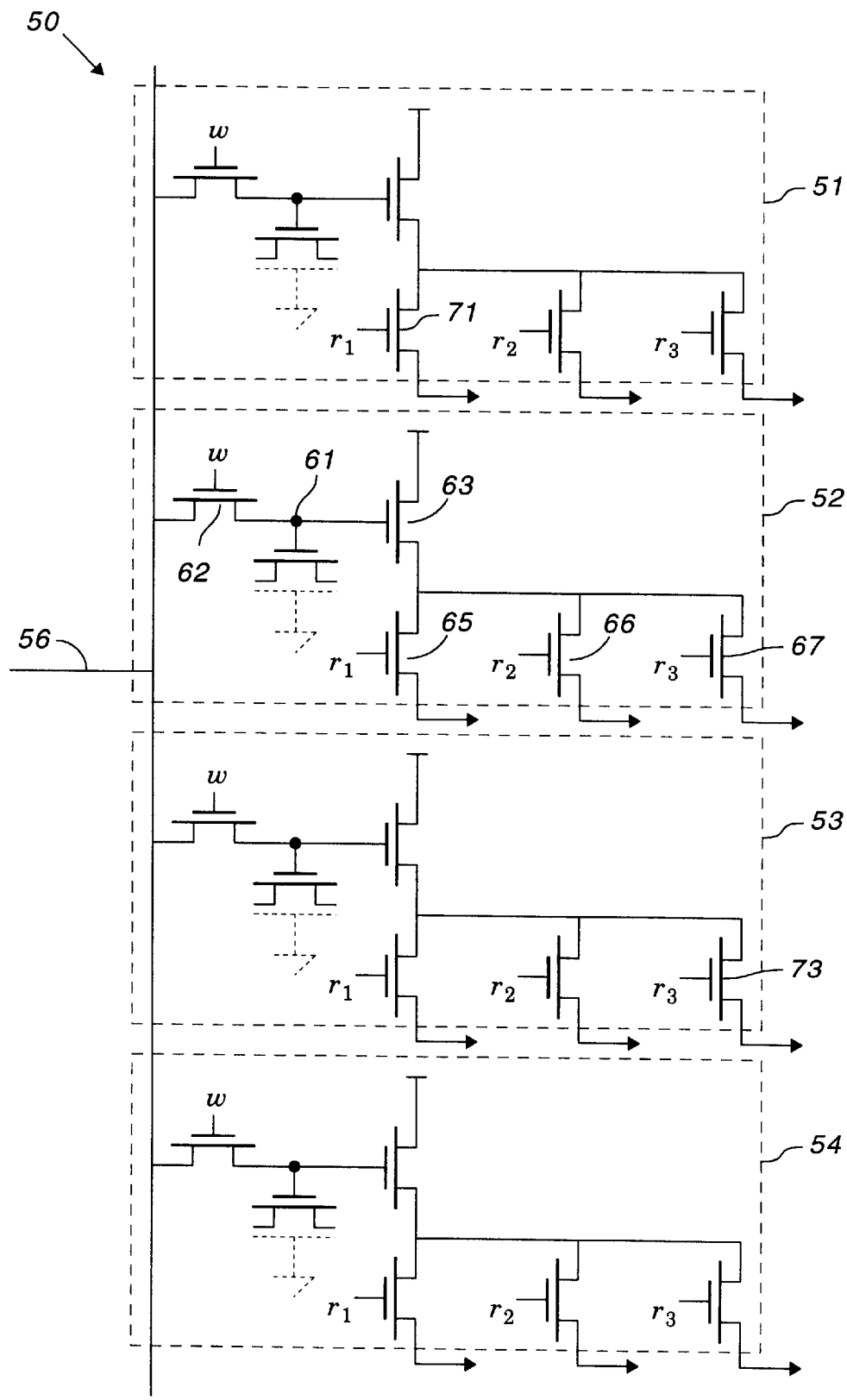
FIG. 3 is a schematic of an analog delay circuit.

FIG. 3 illustrates an analog implementation of the delay circuits. Memory 50 includes a plurality of substantially identical storage sites, such as sites 51, 52, 53, and 54, connected in parallel to input 56. Input 56 corresponds to line 23 (FIG. 1) or may be coupled to line 23 by intermediate buffers, filters, and the like.

Storage site 52 includes storage node 61 coupled to input 56 by write gate 62. Storage node 61 is preferably the gate of an isolated FET (field effect transistor) that exhibits a capacitance relative to ground or common. The amplitude of the input signal is stored on node 61 during the moment that gate 62 is open. Node 61 is coupled through source follower 63 to read gates 65, 66, and 67. These read gates are never open simultaneously, although read gates 71, 66, and 73 may be open simultaneously.

A preferred embodiment of the invention includes differential voltages for improved performance. Thus, there are actually twice as many storage sites, one half for the signal and one half for the inverted signal. In a read operation, the difference in voltage between node 61 and the corresponding opposite node is read.

If the sites are written in the order numbered in FIG. 3, then, relative to site 54, site 53 is Ø−, site 52 is Ø, and site 51 is Ø+. In actual practice, adjacent sites are not used and the "middle" site is actually slightly closer to the higher number (Ø−) read site, thereby assuring the under-correction described above for facilitating fine delay correction.

The invention thus provides a low frequency tag for eliminating acoustic echoes. The tag is unobtrusive in a telephone system because it is not a pure tone but filtered noise. The tag is substantially non-directional or is substantially omnidirectional because of the low frequency used. At low frequency, the wavelength of the tag is on the order of one meter, which reduces "fold-over" errors common at shorter wavelengths in speaker phones. By using a pseudo-random signal, the system can converge quickly because correlation is sharper than with non-random signals. By using a known, consistent signal, the system does not have to contend with variations in sound level while trying to lock.

Having thus described the invention it will be apparent to those of skill in the art that various modifications can be made within the scope of the invention. For example, the difference in delay between the channels, defined by microphone input 21 and line 23, is relative and one could place delays or offsets in either channel. Digital memory could be used instead of analog memory but the A/D and D/A conversions increase processing time. The tagging signal can be continuous, intermittent, or on demand. The invention uses time delay and any circuit introducing a time delay can be used to implement the invention. One could use non-sequential memory sites, e.g. based on a bit-map or a look-up table, but such would complicate addressing the sites and slow the process slightly. Thus, sequential memory sites are preferred.

What is claimed as the invention is:

1. Apparatus for adjusting the delay of a first signal relative to a composite signal containing an echo of said first signal, said apparatus comprising:

a noise generator;

a summing circuit having a first input for receiving said first signal, a second input coupled to said noise generator, and an output;

first, second, and third variable delay circuits, wherein the delay introduced by the first delay circuit is greater than the delay introduced by the second delay circuit, which is greater than the delay introduced by the third delay circuit, the output of the summing circuit being coupled to an input of each of said first, second, and third variable delay circuits;

a first multiplier having a first input coupled to the first delay circuit and a second input coupled to receive said composite signal;

a second multiplier having a first input coupled to the third delay circuit and a second input coupled to receive said composite signal;

a difference circuit coupled to the first multiplier and to the second multiplier, said difference circuit having an output coupled to a control input of each of said first, second, and third variable delay circuits.

2. The apparatus as set forth in claim 1 wherein said noise generator includes a pseudo-random noise generator coupled to a low pass filter.

3. The apparatus as set forth in claim 1 wherein said first, second, and third variable delay circuits are three sequential sites of a memory circuit.

4. The apparatus as set forth in claim 1 wherein said memory circuit is analog.

\* \* \* \* \*